March 9, 1937.     G. LERCH ET AL     2,072,989
CALCULATING MACHINE
Original Filed Sept. 3, 1929    12 Sheets-Sheet 1
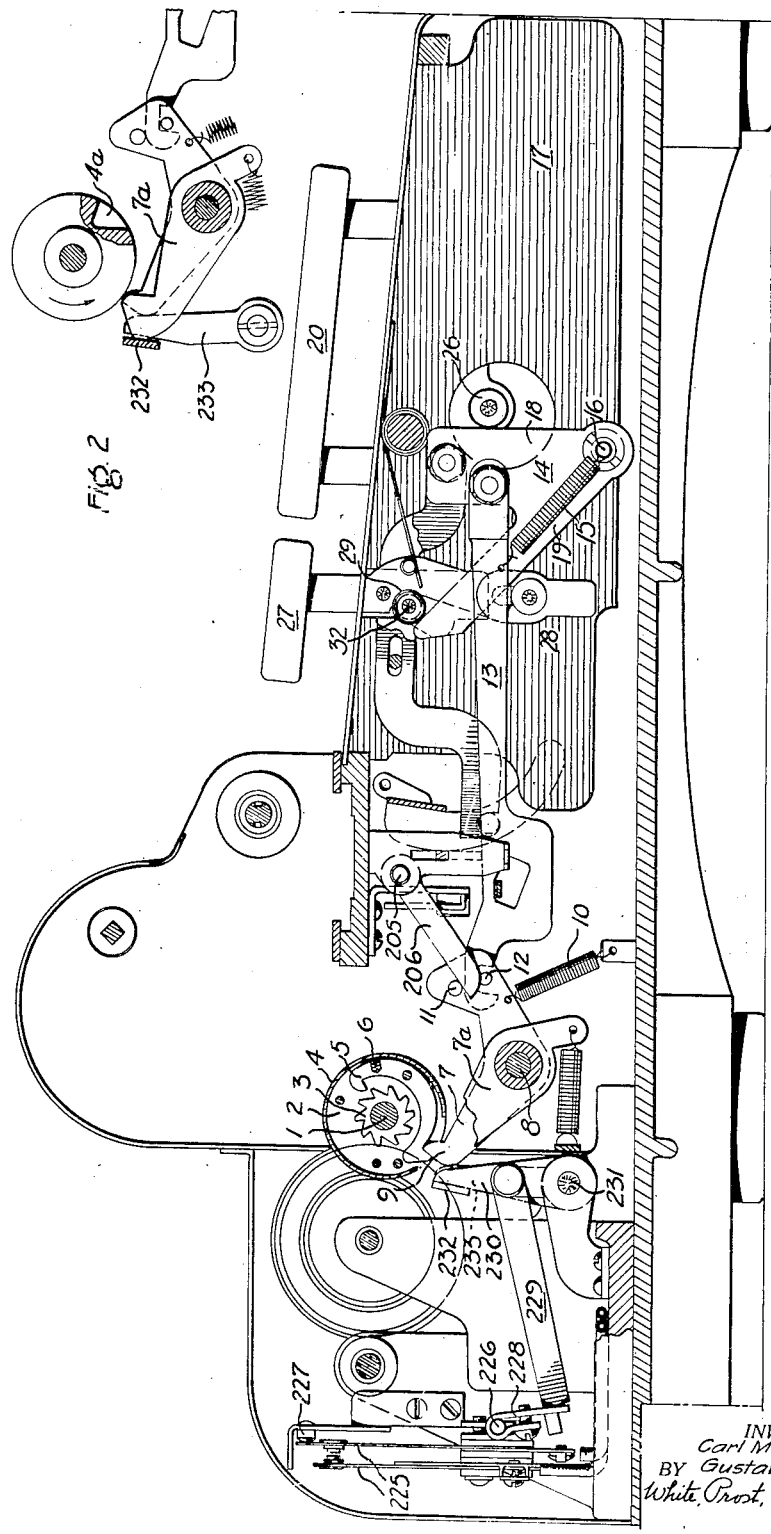
INVENTORS
Carl M. F. Friden
BY Gustav Lerch
White, Prost, Flehr & Lothrop
ATTORNEYS

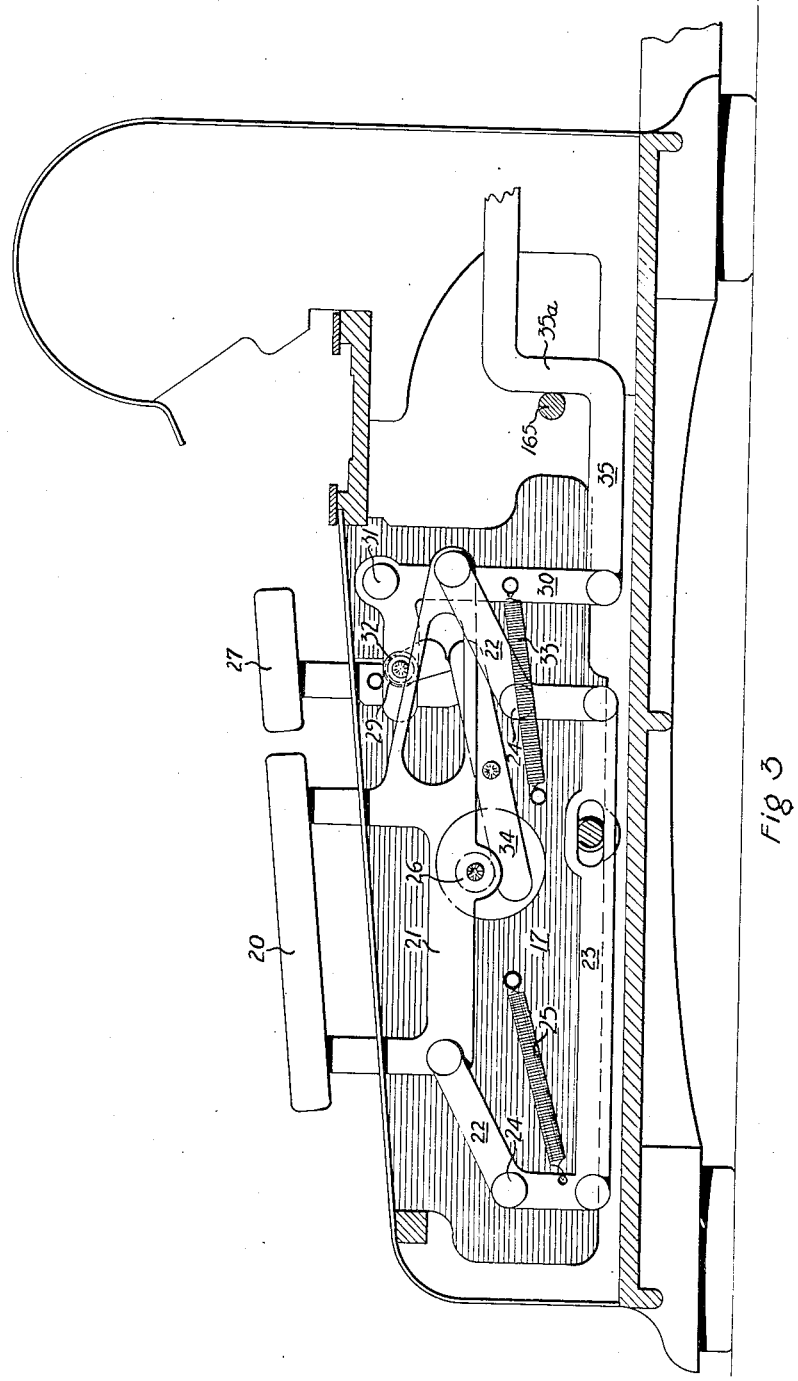

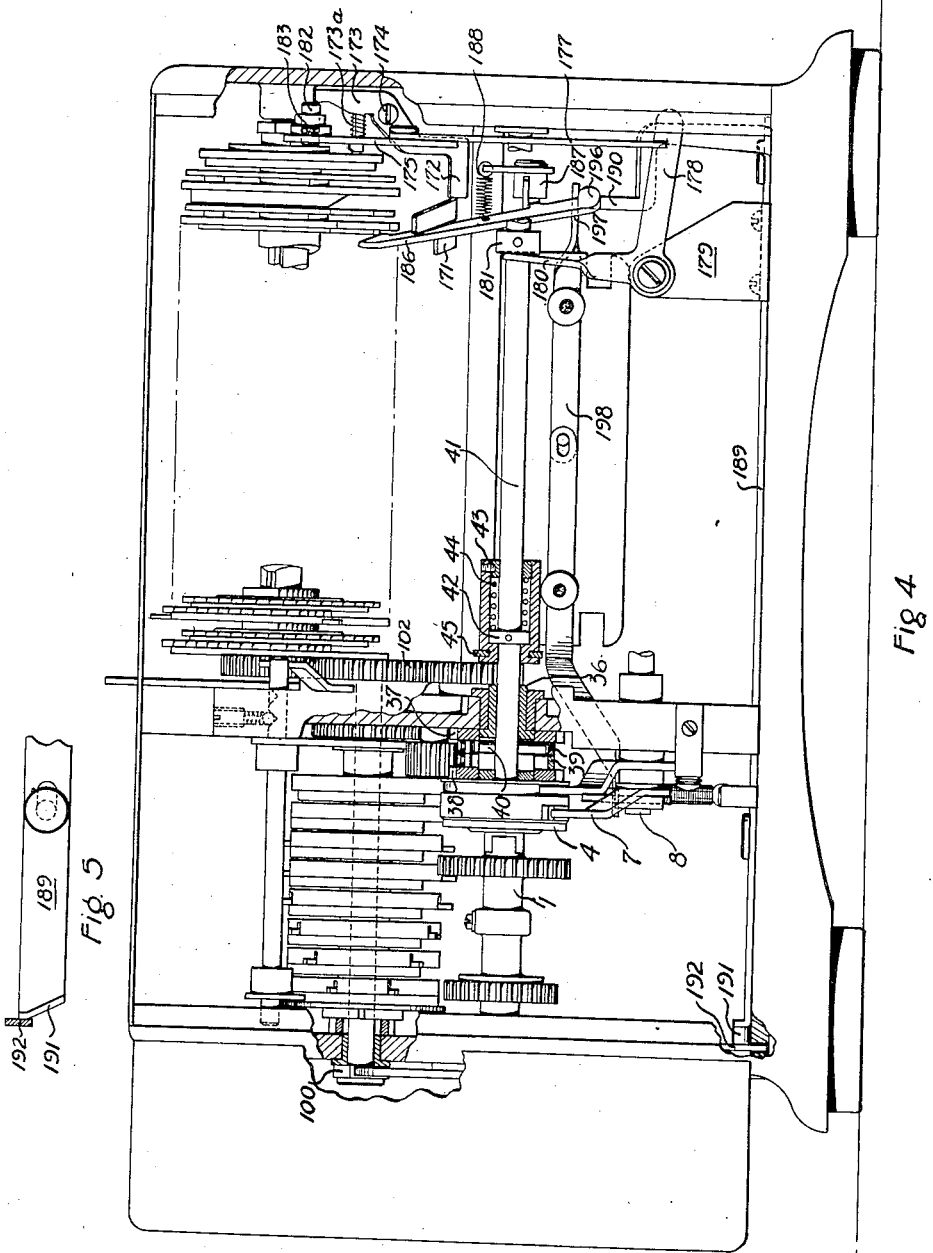

March 9, 1937.  G. LERCH ET AL  2,072,989
CALCULATING MACHINE
Original Filed Sept. 3, 1929  12 Sheets-Sheet 6
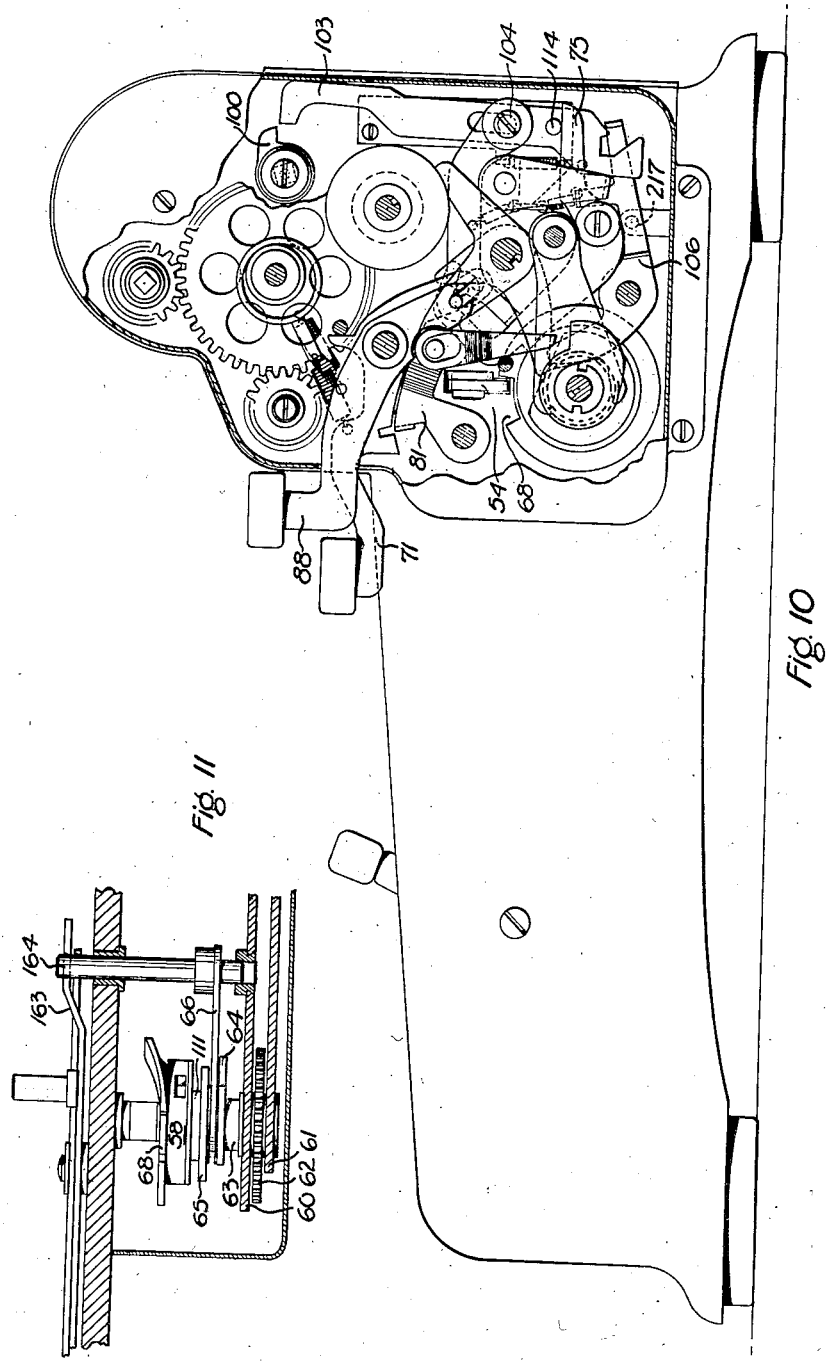
INVENTORS
Carl M. F. Friden
Gustav Lerch
BY White, Prost, Flehr & Lothrop
ATTORNEYS March 9, 1937.　　　G. LERCH ET AL　　　2,072,989
CALCULATING MACHINE
Original Filed Sept. 3, 1929　　12 Sheets-Sheet 7

INVENTORS
Carl M. F. Friden
Gustav Lerch
BY White, Prost, Fehr & Lothrop
ATTORNEYS

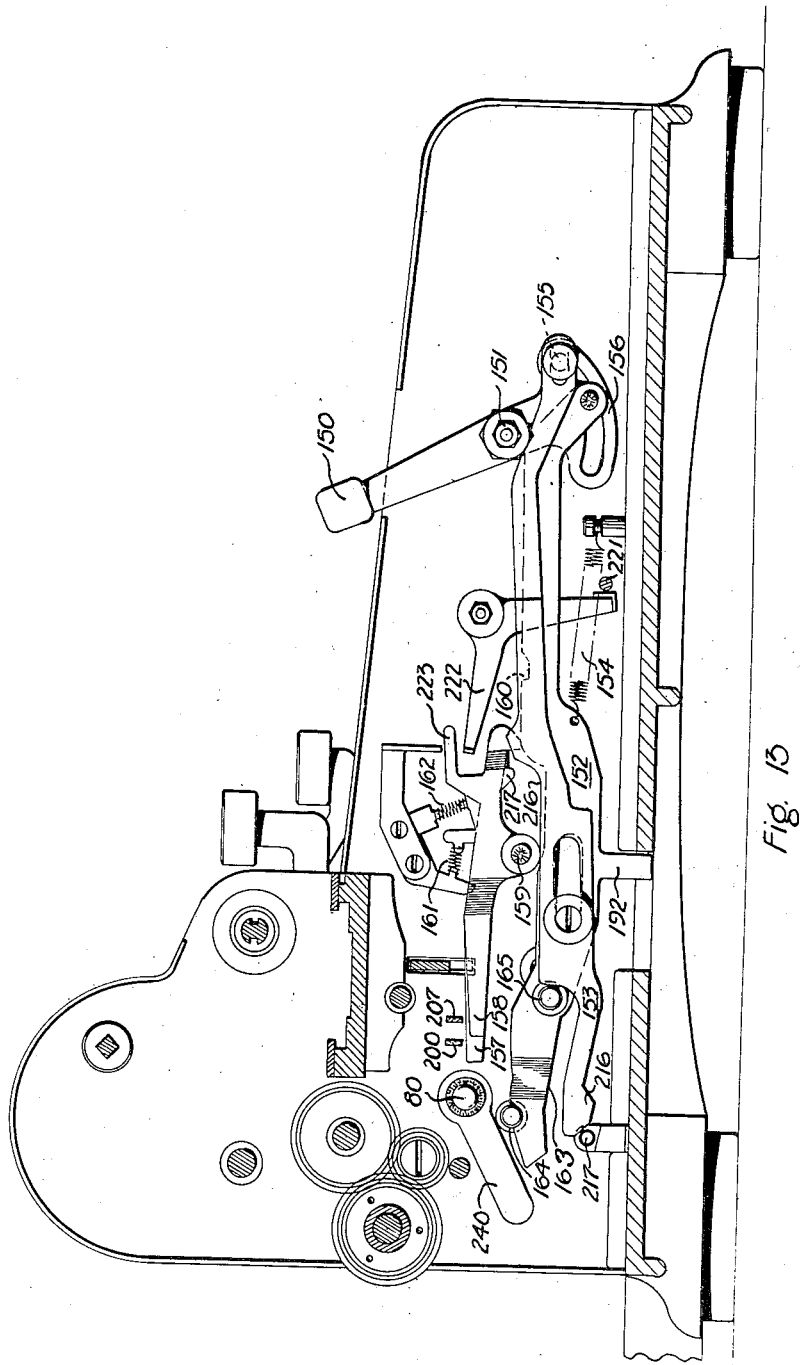

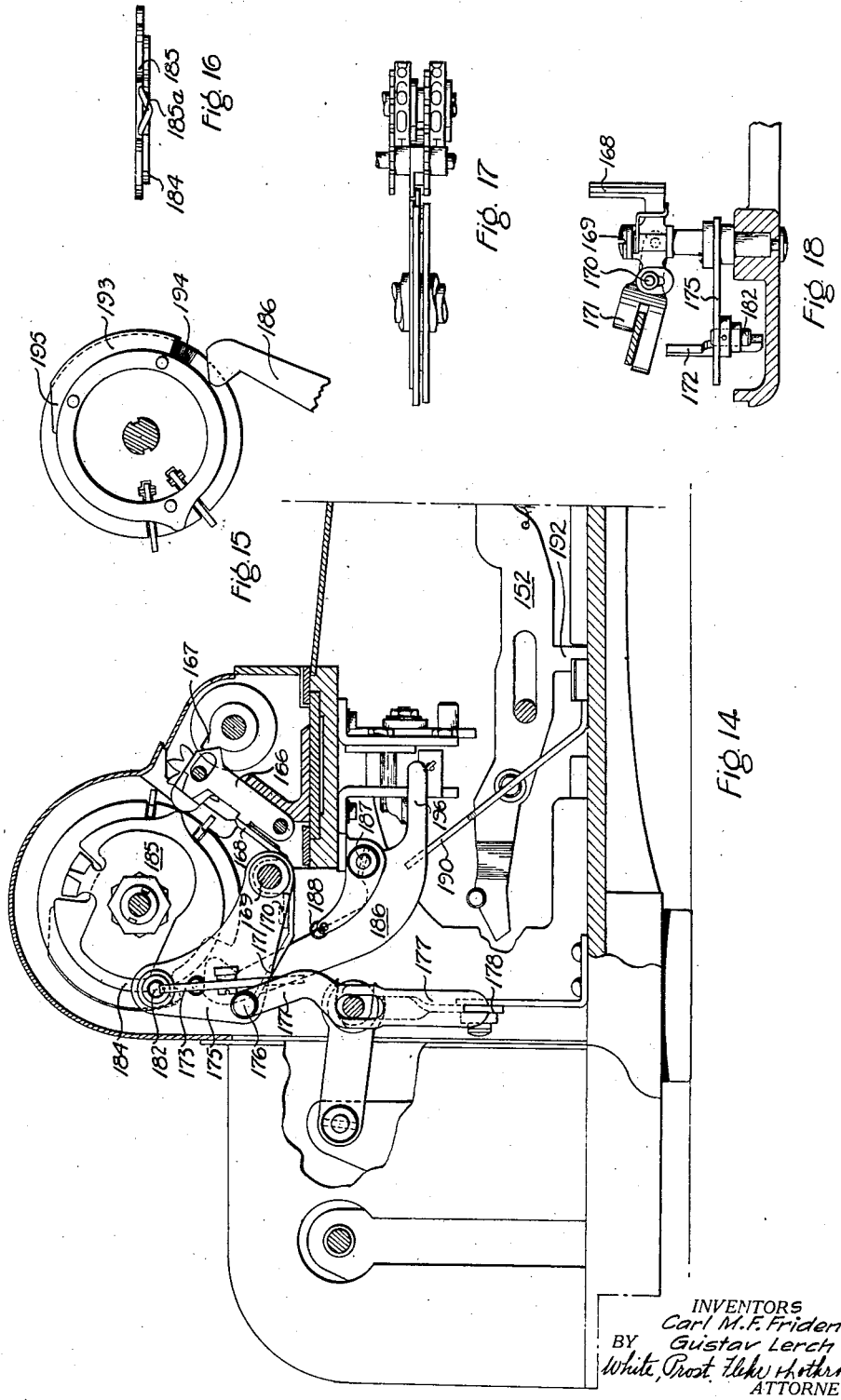

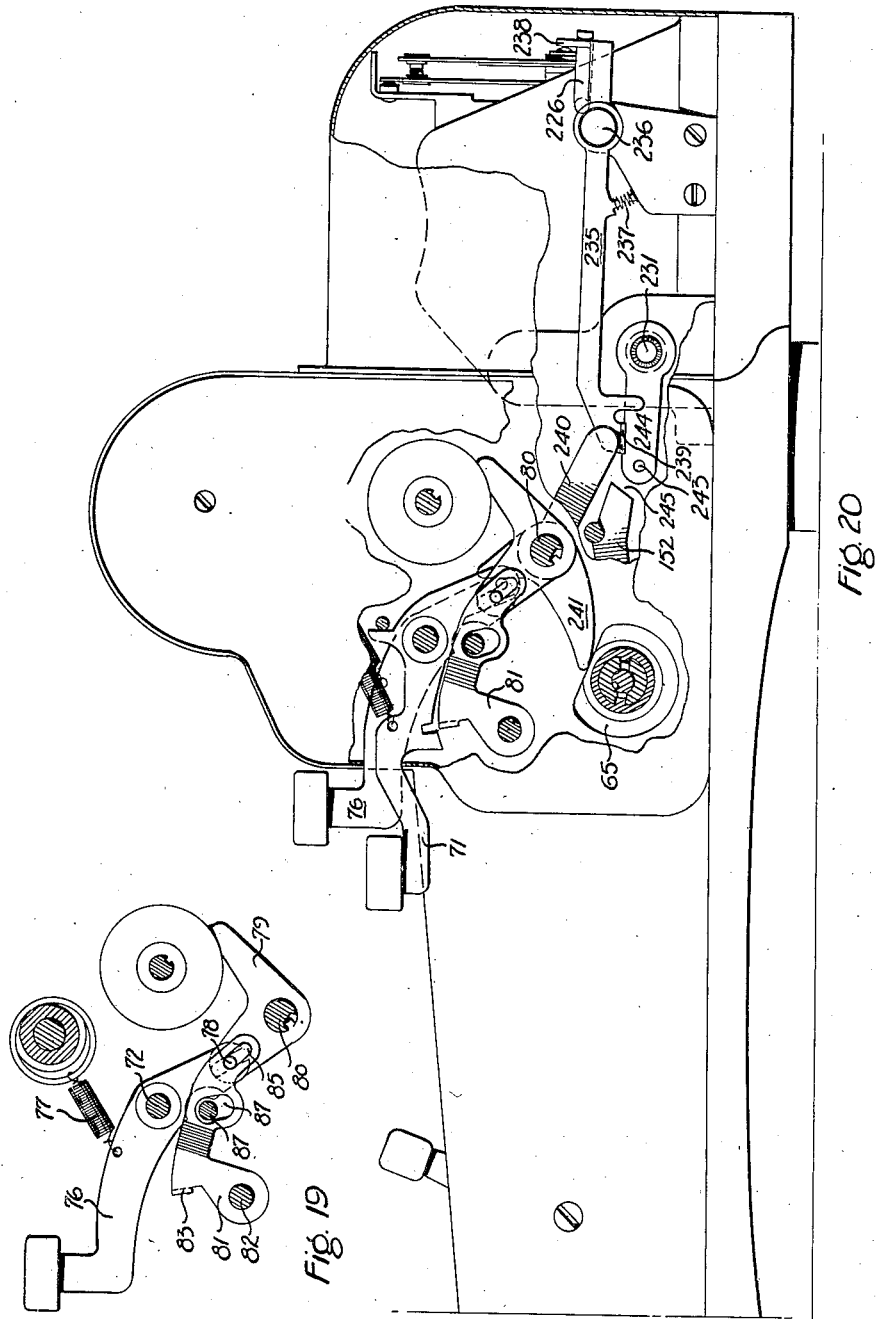

March 9, 1937.    G. LERCH ET AL    2,072,989
CALCULATING MACHINE
Original Filed Sept. 3, 1929    12 Sheets-Sheet 12

INVENTORS
Carl M. F. Friden
BY Gustav Lerch
White, Prost, Fluke & Lothrop
ATTORNEYS Patented Mar. 9, 1937

2,072,989

UNITED STATES PATENT OFFICE.

2,072,989

CALCULATING MACHINE

Gustav Lerch, Oakland, and Carl M. F. Friden, Piedmont, Calif., assignors to Marchant Calculating Machine Company, a corporation of California Application September 3, 1929, Serial No. 390,184
Renewed September 25, 1935

8 Claims. (Cl. 235—63)

The present invention relates to calculating machines and particularly to the reversible rotary actuator type of machine disclosed in the patent to Friden, Number 1,643,710 dated September 27, 1927, to which reference is hereby made for a full disclosure of features not treated specifically herein. The present invention concerns particularly improved means for automatically controlling the machine in multiplication and division, and improved means for automatically shifting the accumulator carriage relative to the actuator mechanism in these operations.

It is an object of the present invention to provide improved means for controlling the machine in the automatic performance of problems in division.

Another object of the invention is the provision of improved means for initiating and terminating automatic division operations.

Another object of the invention is the provision of a single control operable selectively to initiate or terminate an automatic division operation.

Another object of the invention is the provision of improved means for controlling automatic shifting of the carriage in automatic division operations.

Another and principal object of the invention is the provision of an improved means for shifting the carriage of a calculating machine.

Another object of the invention is the provision of means for shifting the carriage under control of the automatic multiplication mechanism.

Another object of the invention is the provision of a common control which may be operated to cause shifting of the carriage by either the automatic division or the automatic multiplication mechanism.

The present invention is exemplarily embodied in a machine of the rotary reversible type provided with a shiftable accumulator into which items are set by means of a keyboard and a counter controlled by the positioning of the accumulator to register the number of actuations thereof in the proper denominational order.

Addition and subtraction are performed by merely setting the items on the keyboard and operating the appropriately designated control bars. The counter here serves to register an item count since the carriage is not shifted.

Multiplication is performed by setting the multiplicand on the keyboard. setting the carriage far enough to the left to accommodate the digits of the multiplier in the counter, as indicated by its pointer, and setting in the digits of the multiplier consecutively in their natural reading order by means of the special multiplier keys. The multiplier will here be registered on the counter, since the carriage is automatically shifted one step to the left after the setting in of each digit of the multiplier.

Division is performed by setting up the dividend in the accumulator in the manner of an additive item; setting up the divisor on the keyboard, and shifting the division lever. The machine performs all the successive subtractions, corrective additions and carriage shifts automatically, bringing the machine to rest when the quotient has been determined to the capacity of the machine. The quotient is registered in the counter.

In the drawings forming a part of this specification:—

Figure 1 is a longitudinal section looking toward the right, and showing the drive and power control mechanisms.

Figure 2 is a detail of a portion of the power control mechanism.

Figure 3 is a longitudinal section showing the plus and minus bar structures.

Figure 4 is a lateral section showing the reversing gear and division control mechanisms.

Figure 5 is a detail of a portion of the division control mechanism.

Figure 10 is a longitudinal section of the shift and accumulator clearing controls.

Figure 11 is a sectional plan of the shift clutch and controls.

Figure 13 is a longitudinal section showing the division control lever and associated mechanism.

Figure 14 is a longitudinal section showing the division reversing controls.

Figure 15 is a detail of the means for arresting the actuator at the end of a corrective rotation.

Figures 16, 17, and 18 are details of portions of the mechanisms shown in Figures 14 and 15.

Figure 19 is a detail of the accumulator clearing mechanism.

Figure 20 is a longitudinal section showing the shift and accumulator clearing mechanisms with their power control.

Figure 21:
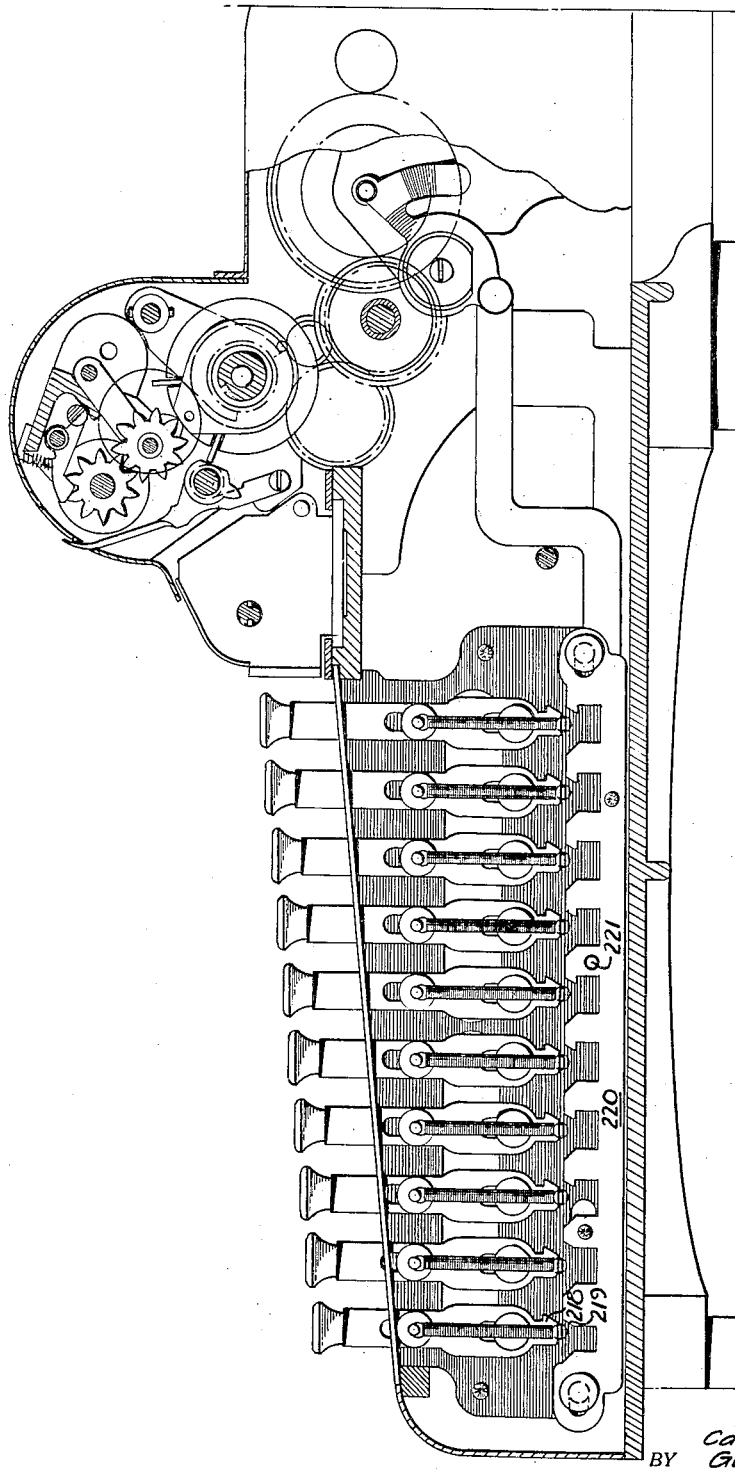

Figure 21 is a longitudinal section showing the automatic multiplier key mechanism.

Figure 22:
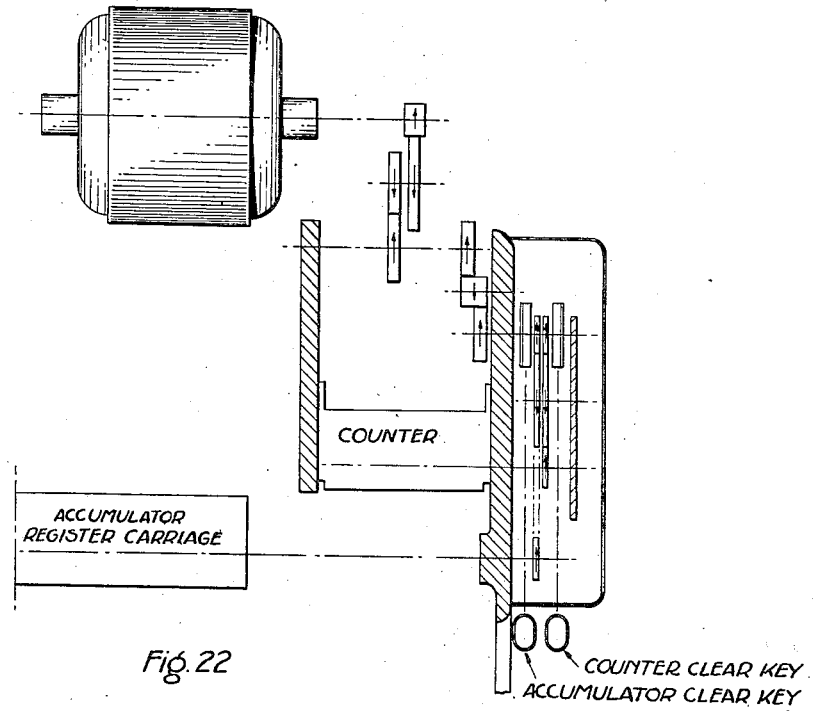
Figure 23:
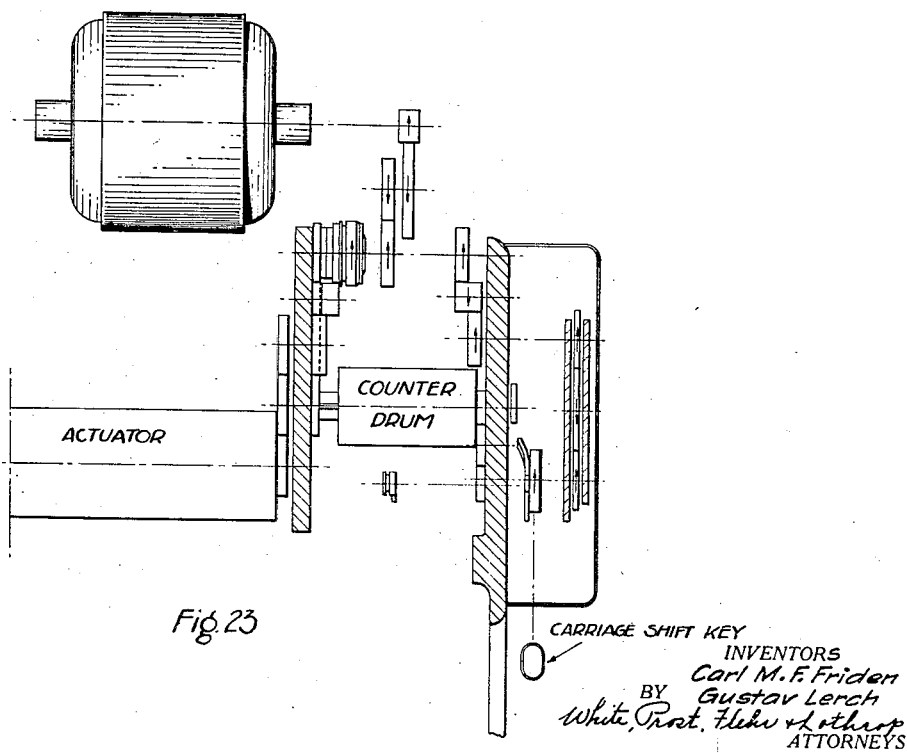

Figures 22 and 23 are diagrammatic representations of various gear trains.

Drive control

In the present embodiment, the driving mechanism comprises an electric motor which is connected to the drive shaft 1 by appropriate speed reducing gearing and is adapted to be intermittently connected to the calculating mechanism to drive the same.

The means whereby the drive is connected to the calculating mechanism includes a clutch 2 (Fig. 1), the driving member of which is a toothed wheel 3, fixed on one end of the drive shaft 1. Enclosing the toothed wheel 3, is a circular housing 4 which constitutes the driven member of the clutch, and pivoted within this housing in a position to engage the toothed wheel 3, is a driving pawl 5. This pawl is normally pressed into engagement with the toothed wheel by means of the inset compression spring 6 but is adapted to be maintained in its non-engaging position by means of the clutch control mechanism. The clutch control mechanism comprises a bell crank member 7 journaled on a stub-shaft 8 on the machine frame and carrying on one arm a foot 9 adapted, when the actuator is in full cycle position, to project through an appropriately positioned aperture in the clutch housing 4 to engage the tail of the pawl 5 and urge it to clutch disengaging position.

A spring 10, tensioned between a stud on the machine base and the opposite arm of the bell crank 7 tends to urge the foot 9 into clutch disengaging position, so that in the absence of intervention by other instrumentalities the actuator will be brought to rest with the clutch in disengaged position when it reaches full cycle position after a rotation. Means are provided for operating the bell crank 7 to engage the actuator for the number of rotations requisite to perform a desired calculation, and pins 11 and 12 are provided on the forward end of the bell crank for this purpose. Pin 11 functions in the automatic restarting of the actuator after a carriage shifting operation in the automatic performance of division, and will be referred to hereafter. Pin 12 is engaged by the notched rear end of the control link 13 which is pivoted at its forward end to control plate 14 and normally held in position overlying the pin 12 by spring 15 tensioned between the pivot of the control plate and an intermediate point on the control link. Control plate 14 is pivoted at 16 on an intermediate vertical plate 17 in the machine, and comprises a forward vertical portion 18 adapted to cooperate with the plus bar and a rear angular portion 19, adapted to cooperate with the minus bar. Operation of either of these bars is adapted to impart a counter-clockwise oscillation to control plate 14, as will be hereinafter described. This imparts corresponding counter-clockwise oscillation to the clutch operating bell crank 7 permitting engagement of the driving pawl 5 for the period that such adjustment is maintained. The means whereby the plus and minus bars accomplish this end will now be described.

Plus and minus bars

The present invention includes manual means for controlling the rotation of the actuator for a plurality of operations selectively in either a positive or a negative direction. The means for manually controlling rotation in the positive direction comprises a plus bar 20, supported on a frame 21 (see Fig. 3). This frame is supported on one end of a pair of parallel links 22 which are connected together at their opposite ends by a link 23, and are pivoted intermediate their ends at 24 to the plate 17. Spring 25, tensioned between the plate and the lower end of the forward link, serves to hold the plus bar in its elevated position. The frame 21 carries a roller 26 which extends through an aperture in the plate 17 and serves to operate the clutch mechanism in the manner hereinafter set forth. The means for controlling negative rotation of the actuator, comprises a minus bar 27 which is slidably supported on the plate 17 by means of a pin and slot connection 28 (Fig. 1). This minus key has an offset camming portion 29. A bell crank 30 is pivoted on the opposite side (Fig. 3) of the intermediate plate at 31, and carries a roller 32 which extends through the aperture in the side wall into juxtaposition with the offset camming portion 29 of the minus bar stem. Depression of the minus bar serves to force this roller downwardly, and to the rear against the action of the spring 33 tensioned between the intermediate plate and the lower end of the bell crank 30, and which serves to hold the end of the bell crank carrying the roller 32 in its most elevated position.

Likewise, depression of the plus bar moves its roller 26 downwardly and to the rear, as a result of the manner in which it is supported upon the parallel links 22. The roller 26 projects through an aperture in the intermediate plate 17, and abuts the forward vertical arm of the control plate 18. The roller 32 likewise projects through an aperture in the intermediate plate 17, and abuts the rear angular arm 19 of the control plate. Thus, it will be seen that operation of either key will result in a counter-clockwise oscillation of the control plate and consequent engagement of the actuator clutch. An interlock, to prevent simultaneous operation of the keys 20 and 27, is provided in the form of a rocking bar 34, pivoted intermediate its ends on the intermediate plate 17. One end of this bar underlies the roller 26 on the plus bar frame, while the other underlies an extension of the roller carrying arm of the bell crank 30. Depression of either key serves to rock the bar 34 into direct contact with the other member which it underlies, to prevent its concurrent operation. Depression of the minus bar also serves to actuate the reversing gearing by causing rearward motion of the link 35, pivoted to the lower end of bell crank 30. Rearward motion of the link 35 oscillates a worm cam playing in a slot in the shaft which carries the gear shifting fork as shown in the Friden patent above referred to. The reversing mechanism has, however, been modified to permit a reversal of the direction of rotation of the actuator without effecting a disengagement of the clutch, under certain conditions.

Reversing gearing

Fixed to the clutch housing 4 (Fig. 4) for rotation therewith, is a sleeve 36, journaled in an intermediate wall of the machine and journaled upon this sleeve adjacent the clutch housing, are two gears 37, 38. On their contiguous faces these gears are provided with annular flanges 39, each of which is provided with two oppositely disposed seats of different depth, designed to receive pin 40 fixed in shifting shaft 41, and adapted to engage said seats through oppositely disposed orifices in the sleeve 36. A shifting of the pin 40, then by means of the shaft 41, causes one or the other of the two gears to be engaged for drive by the clutch housing.

One of these gears includes an intermediate idler in its driving train to the actuator, which the other omits, and they therefore serve to drive the actuator in opposite directions, as shown diagrammatically in Fig. 23. This portion of the mechanism is fully disclosed in the patent to Friden, Number 1,682,901 of September 4, 1928. In Figure 4 the pin 40 is shown so positioned as to drive the actuator in the additive direction, into which position it is normally urged by the spring 33 supporting the minus bar. Means are provided for shifting the shaft 41 to carry the pin into engagement with the negative driving gear 38. This means is made resilient so that its control may be superseded by other controls operative in automatic division operations, as will be hereinafter set forth. The shaft 41 carries a fixed collar 42 which is enclosed by a slidable sleeve 43. This sleeve also encloses a compression spring 44, one end of which bears against the collar, and the other end of which bears against one end of the sleeve, thus maintaining the sleeve in such a position over the collar that its other end bears against the collar. The shifting fork above referred to engages this collar 43 as shown at 45, and lateral motion thereof tends to shift the shaft 41 and its pin 40 into engagement with either of the two driving gears selectively.

*Motor driven carriage shift*

Means are provided for effecting power shifting of the accumulator carriage relative to the several denominational orders of the actuator, either under control of the machine function controls which are operative in multiplication and division as automatically performed by this machine, or under manual control by means of a special key. The carriage shifting mechanism employed is fully illustrated and described in applicant's copending application, Serial Number 539,422, filed February 27, 1922, to which reference is hereby made for a disclosure of a suitable form of carriage shifting means. The present description will be confined to the power operated means for this carriage shift.

Figure 6:
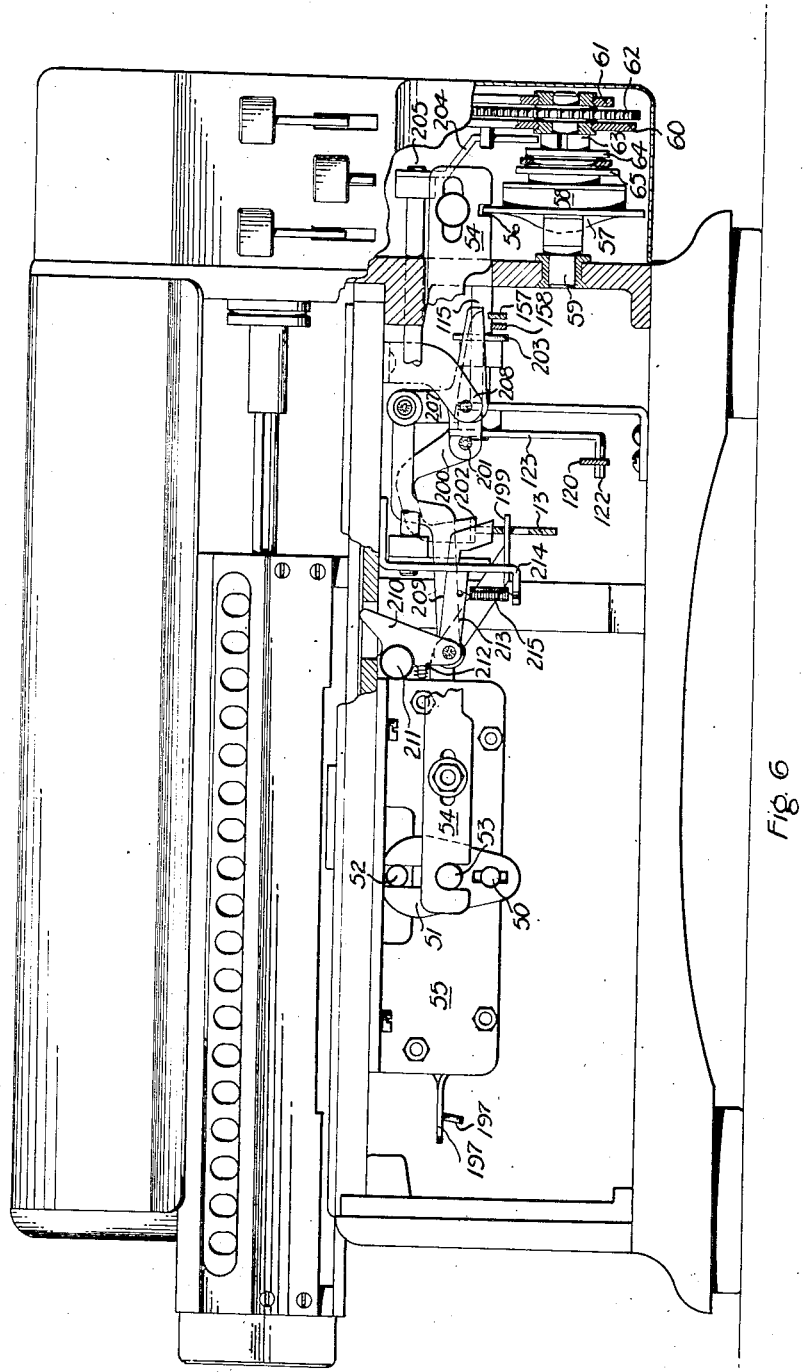
Figure 6 is a lateral section showing the carriage shifting and calculation terminating mechanisms.

The manual carriage shifting mechanism (see Fig. 6) includes a manually operable rod 50 suitably journaled in the machine frame and carrying notched plate 51 at its rear end. Stud 52 on the carriage shifting mechanism, lies in the notch in said plate, and as the rod 50 is manually rocked it is moved to the right or left, acting to shift the carriage in the desired direction.

In the present construction the plate 51 carries a pin 53 which lies in a notch in the left end of an operating link 54, suitably supported by means of a pin and slot connection on a plate 55 depending from the carriage trackway. The right end of operating link 54 is provided with a notch 56 cooperating with peripheral cam 57 on the housing of the carriage shifting clutch 58 to impart a leftward reciprocation to the link 54 on each rotation of the cam 57, shifting the carriage one step to the left. The shaft 59, which drives this clutch, is journaled between the side frame of the machine, and additional supporting plates 60 and 61. It is driven by an extension of the gear train from the resetting clutch shaft, as indicated in Figs. 22 and 23, the terminal gear only of the train being shown at 62. The shaft 59 also carries a sleeve 63 rigid with the clutch housing 58, and to which are keyed the two cams 64 and 65. These cams are always driven when the carriage shifting clutch is engaged, but are adapted to be shifted laterally on the sleeve 63 by means of the shifting fork 66, to selectively engage their respective cooperating members for a purpose and by a means hereinafter to be described.

Figure 7:
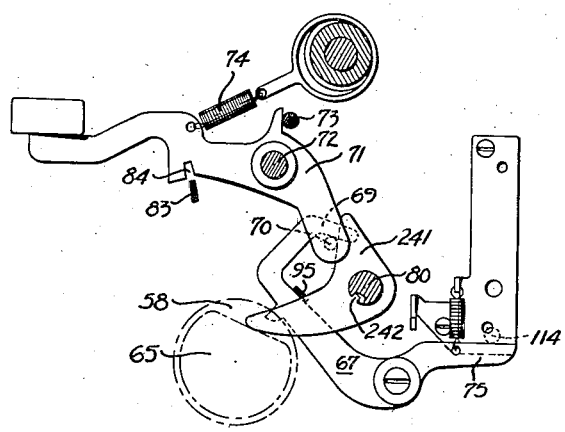
Figure 7 is a detail of the shift clutch control.
Figure 8:
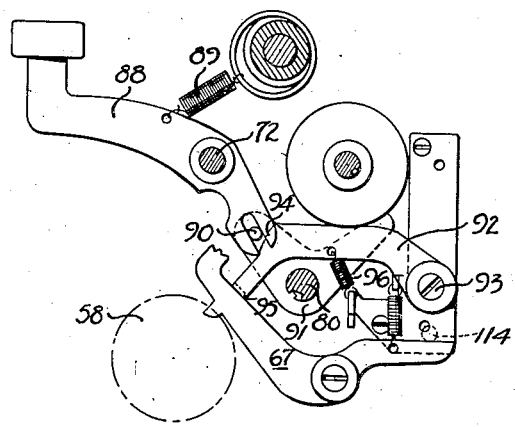
Figure 8 is a detail of the counter clearing mechanism.

The clutch 58 is of the same pawl and ratchet wheel type as the main actuator clutch and is adapted to be engaged for one or more rotations by retraction of its operating arm 67 (Fig. 7) from contact with its internal pawl. The operating arm 67 is adapted when in clutch disengaging position to hold the clutch housing 58 in a definite full cycle position in the same manner that the main actuator clutch is so held. When the clutch housing 58 is held in full cycle position a notch 68 (Fig. 11) in the periphery of the cam 57 underlies the carriage shift operating mechanism link 54 so that the link may be freely shifted in the operation of the manual carriage shifting mechanism. The clutch operating arm 67 (Fig. 7) is provided with an upper hooked portion 69 arranged to overlie pin 70 on the lower end 71 of the clutch operating key lever. This key lever is journaled on shaft 72 and is urged to its non-effective position against stop 73 by spring 74 tensioned between the forward end of the key and a convenient shaft of the machine. The arm 67 is also provided with a tail 75 for automatic operation as will be hereinafter set forth.

An interlock is provided between the shift key and the accumulator clear key to prevent simultaneous engagement of the clutches acting to clear the accumulator mechanism in the shiftable carriage and to shift the carriage. The accumulator clear key 76 (Fig. 19) is journaled on shaft 72 and is normally urged to its uppermost position by a spring 77 tensioned between the forward arm of the key and a convenient shaft of the machine. At its lower end, the key stem has a notch which engages a pin 78 on one arm of the accumulator clutch operating bell crank 79, journaled on shaft 80, for limited movement. The locking member 81 supported on shaft 82 has a laterally bent upper portion 83 extending under a cooperating notch 84 in the shift key stem 71 (see Fig. 7). The tail of the member 81 has a slot 85 overlying pin 78 on the clutch control lever 79. Depression of the accumulator clear key rocks the locking member in a counterclockwise direction bringing its laterally bent portion 83 out of alignment with the notch 84 and under the body of the shift key in such a manner as to lock it against operation. Correspondingly, depression of the shift key engages its notch 84 over the laterally bent portion 83 of the locking member and prevents it from being rocked, thus preventing operation of the accumulator clear key. A slot 86 intermediate the ends of the locking member 81 encloses a fixed stud 87 and thus limits the throw of the accumulator clear key in both directions.

A second interlock is provided to prevent concurrent operation of the shift key and the counter clear key. The counter clear key 88 (Fig. 3) is journaled on the shaft 72 and is normally urged into its uppermost position by the spring 89 tensioned between the forward portion of the key and a convenient shaft of the machine. The tail of the key has a slot positioned to engage pin 90 on the counter clutch operating bell crank 91 in such a manner that depression of the key will rock the bell crank 91 in a clockwise direction to engage the said clutch. The locking member 92 is pivoted on the machine frame at 93 and has an intermediate curved portion 94 lying just behind the pin 90. On its forward end is a laterally bent portion 95 overlying the shift clutch control lever 67. A spring 96 tensioned between the machine frame and an intermediate portion of the locking member 92 normally urges it downwardly into engagement with the shift clutch control lever 67. When the shift clutch control lever is lifted to engage its clutch the locking member 92 is also lifted, placing its curved portion directly behind and in contact with pin 90, preventing the clockwise rotation of member 91 which is necessary to engage the counter clearing clutch. Correspondingly, when the counter clear key is depressed, the pin 90 is thrown back into contact with the upper part of the curved portion 94 of locking lever 92, preventing the raising of this lever necessary to an operation of the shift clutch.

*Automatic control of carriage shifting*

Figure 9:
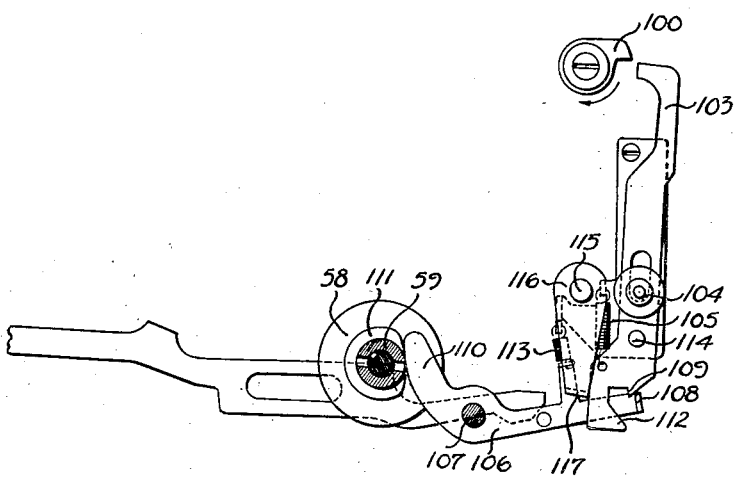
Figure 9 is a detail of the automatic shift clutch control.

Automatic means are provided for engaging the carriage shift clutch at the proper time in automatic multiplication and automatic division operations. Automatic carriage shifting always occurs at the end of an additive rotation of the actuator in automatic multiplication immediately after the last successive addition in each denominational order and in automatic division at the end of the additive rotation which corrects the overdraft in each denominational order. The shift clutch releasing means is therefore arranged to be driven with the actuator in additive rotation and controlled from the appropriate machine function control. A tripping finger 100 (Figs. 4, 9 and 10) is therefore arranged on the side frame end of shaft 101 which extends through the sleeve carrying the counter transfer drum and is connected to an intermediate gear 102 of the actuator drive train. Regarding the machine from the right side thereof it will be observed that the actuator rotates in counter-clockwise direction for addition. It will thus be seen that in additive rotation of the actuator the tripping finger 100 is rotated in a clockwise direction.

A trip slide 103 is arranged to be vertically reciprocated by the trip finger 100, as the actuator approaches full cycle position, and for pivotal oscillation by its control member 116 to bring it in and out of the path of the trip finger 100, by means of a pin and slot connection 104 through which it is supported on the machine frame. A spring 105, tensioned between the machine frame and the lower arm of the member 103, tends to oscillate it in a clockwise direction and carries it out of the path of the trip finger. A latching member 106, pivoted at 107, has a laterally bent end portion 108, adapted to latch behind a tooth 109 on the trip slide 103 to retain said slide in an active position in the path of tooth 100 until the shift clutch is actuated. The tail 110 of the latch member cooperates with a cam 111, fixed to the shift clutch housing. On rotation of the shift clutch housing, this cam causes the latched member to be rotated in a clockwise direction, bringing its laterally bent end 108 against the cam face 112 of the trip slide and positively camming it out of the path of the tooth 100 to prevent a second actuation of the shift clutch. Spring 113 tensioned between the machine frame and the latch lever, normally tends to hold it in position to engage behind tooth 109. The trip slide 103 carries a pin 114 overlying the tail 75 of the shift clutch operating lever 67 which operates on vertical reciprocation of the trip slide by tooth 100 to withdraw the clutch control arm 67 and permit engagement of the shift clutch. A control shaft 115, journaled in the side frame of the machine, carries a depending lever 116, having a laterally bent end portion 117, lying in contact with the front side of the trip slide 103. The lower end 117 of the lever 116, when moved to the rear by means of control shaft 115, will oscillate the trip slide 103 into its effective position where it will be latched.

*Control of carriage shifting in automatic multiplication*

Figure 12:
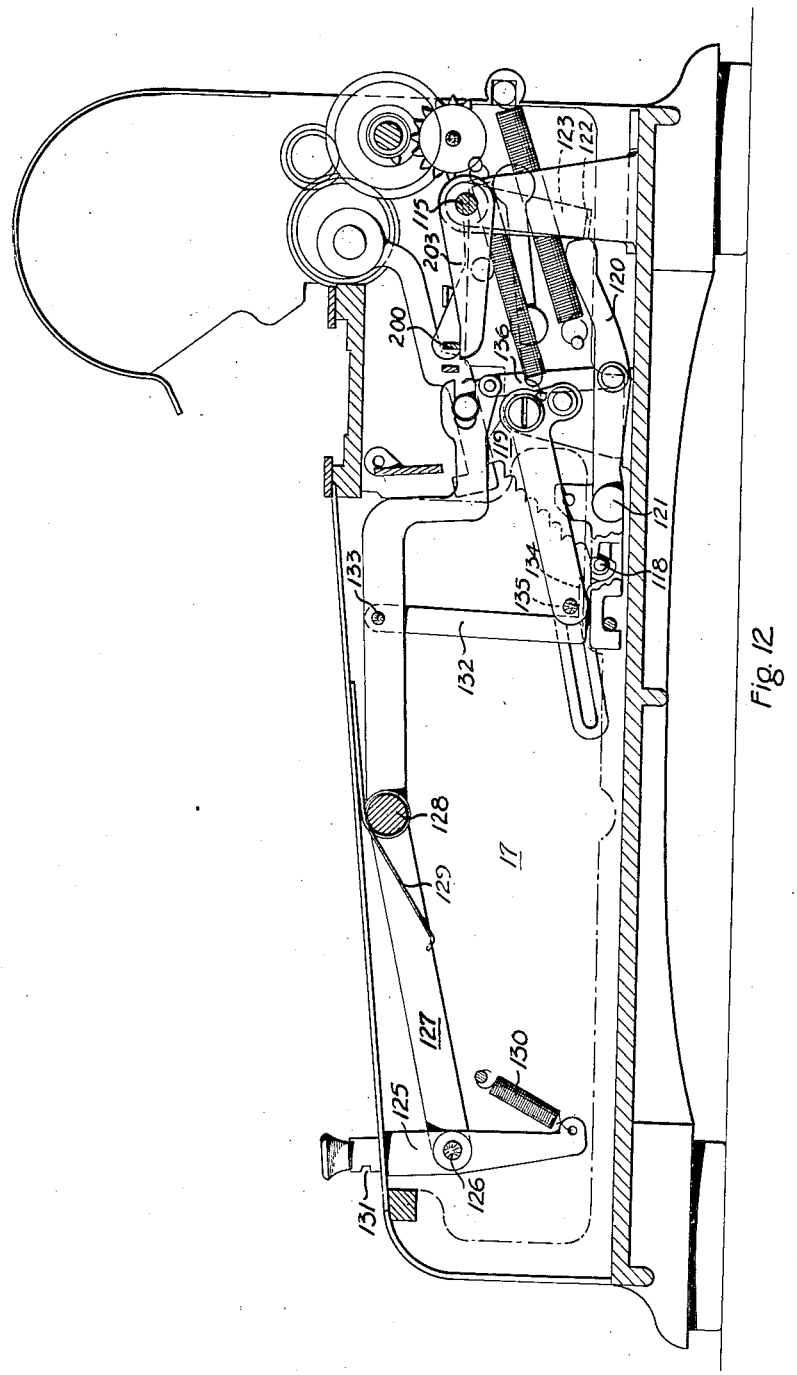
Figure 12 is a longitudinal section of the automatic multiplier mechanism showing the means for controlling the shift clutch.

The automatic multiplication mechanism is fully disclosed in the patent to Friden, Number 1,643,710, here incorporated by reference, and it is deemed sufficient for the purposes of the present case, to point out that the pin 118 (Fig. 12) is differentially positioned vertically by means of the multiplier key's differential mechanism. It is then moved to the rear one step for each additive rotation of the actuator until it effects contact with the appropriate step of plate 119. On the next rotation of the actuator, this plate is moved to the rear with pin 118, to actuate instrumentalities for terminating the calculation. It is at this point in the operation that it is desired to initiate action of the shift clutch lever. There is provided therefor a member 120, pivoted to the plate 119 and 121, and abutting at its rear end a laterally bent portion 122 of a lever 123, depending from the control shaft 115. Rearward motion of the plate 119 then, will impart a counter-clockwise oscillation to control shaft 115, rocking lever 116 carried on its opposite end, and tripping slide 103 into operating relation relative to tooth 100. As the actuator reaches home position, this tooth 100 contacts the upper end of slide 103 depressing the slide and its pin 114 to raise the trip clutch control arm 67 and engage said clutch. As the clutch starts, cam 111 rocks the latch member 106, camming the slide 103 out from under the arrested tooth 100 and releases the clutch control arm 67 so that the trip clutch will be disengaged and arrested in full cycle position at the end of a single rotation. It will be noted that the automatic shift always spaces the carriage to the left. In performing automatic multiplication, therefore, on a machine constructed according to the present invention, the digits of the multiplier are set up in their natural reading order from left to right, the carriage having first been appropriately set to accommodate them.

Means are provided under control of a special key, for disabling this shift clutch control when said key is depressed. This special key 125 (Fig. 12) is pivoted at 126 on a lever 127 journaled in the plate 17 at 128 and urged in a direction to maintain the key in raised position by spring 129. Spring 130, tensioned between the plate and the lower end of the key, tends to rotate the key on its pivot in such a manner that the notch 131 in the upper end of the key stem will engage the edge of the key slot to temporarily retain the key in its depressed position. This key is maintained in depressed position during straight adding and subtracting operations, and acts to limit the rotation of the actuator to a single cycle in either direction. For this purpose a link 132 is attached to the lever 127 at 133 and has a foot 134 extending under a pin 135 of the multiplier pin adjusting mechanism. Depression of the special key raises this link slightly, bringing pin 118 into cooperation with the "one" step of plate 119 so that the plate will be moved during the first rotation of the actuator to cause disengagement of the actuator clutch. To prevent undesirable operation of the automatic carriage shift when this takes place, a second link 136 is provided connecting the rear end of lever 127 with an intermediate portion of member 120. Raising of the rear end of lever 127, incident to the depression of the special key 125, thus raises the rear end of member 120 so that when it moves to the rear with plate 119, it will overshoot the laterally bent end 122 of lever 123 and omit actuation of the shift clutch.

*Automatic division*

Automatic division is performed in the present machine upon entry of the factors in the usual manner, setting the carriage and shifting the division lever into its forward position, whereupon the following operations ensue wholly automatically, and the quotient is accurately registered in the counter mechanism. Shifting of the division lever starts the actuator in the subtractive direction, and it acts to subtract the selected decimal multiple of the divisor from the dividend, registering the number of subtractions in the counter in the usual manner, until an overdraft occurs. The occurrence of an overdraft operates controls which effect a reversal of the actuator driving gear without effecting a disengagement of the actuator driving clutch. The cycle immediately following upon the overdraft cycle therefore corrects the overdraft and a control operative in this cycle acts to disengage the actuator clutch in full cycle position and to engage the carriage shift clutch for a single cycle. The carriage shift clutch in terminating its cycle of operation actuates controls to reengage the actuator clutch and again drive the actuator in subtractive direction. This tour of operation repeats itself successively in consecutive denominational orders until the carriage reaches home position, when a special control intervenes to prevent engagement of the carriage shift clutch and all the mechanism is consequently brought to rest with all controls restored to their normal position.

The automatic division lever 150 (Fig. 13) is pivoted at 151 to the side wall of the machine, and its upper end is rocked toward the front of the machine to initiate a division operation. By this motion it moves toward the rear of the machine main division slide 152, and supplemental division slide 153, against the force of spring 154 tensioned between the base of the machine and the main division slide. The short pin and slot connection 155, connects the supplemental division slide to the division lever so that this slide follows the movement of the division lever in both directions. The main division slide is, however, connected to the division lever by a longer pin and slot connection 156.

This longer pin and slot connection 156 is so arranged that the main division slide will be pushed to the rear by a forward rocking of the division lever, but will not be returned by a return of the division lever to inoperative position. A pair of latching pawls 157 and 158 are pivoted side by side on the side frame of the machine at 159. The heads of both these pawls cooperate with a notch 160 in a widened portion of the main division slide, into which they are pressed by their individual springs 161 and 162, compressed between the forward portion of the respective pawls and an extension of the side frame. By this means the main division slide 152 is latched in the rear position to which it is forced by an operation of the division lever 150 until the two latching pawls 157 and 158 are concurrently raised.

Adjacent its rear end the main division slide 152 has a camming bend 163 which cooperates with a notch in shaft 164 to shift the shaft laterally on a movement of the slide. Shifting of this shaft operates the shifting fork 66 fixed adjacent its opposite end which controls the positioning of cams 64 and 65 for a purpose presently to be described.

Spaced from its rear end the main division slide 152, carries a laterally extending pin 165, the remote end of which lies directly in front of a vertical portion 35a (see Fig. 3) of the link which controls the actuator reversing gear. Rearward motion of the slide 152 then serves to move the link 35 and place the gear control in position to cause subtractive rotation of the actuator.

Concurrently, the bell crank 30 (Fig. 3) attached to the forward end of link 35, is rocked and the upper arm carrying roller 32 is moved downwardly, the roller being carried downwardly and toward the rear of the machine, in the same manner as when actuated by the minus bar. In this motion it rocks control plate 14 to cause engagement of the main actuator clutch 2. This mechanism is locked in this position for the duration of the division operation by the latches holding the main division slide in its rearward position. The actuator, being thus set in motion, rotates continuously, subtracting the divisor or its decimal multiple from the dividend set in the accumulator carriage at each successive rotation until an overdraft occurs. In an overdraft operation, as is well known in the art, a borrowing carry operation occurs which results in all effective numeral wheels to the left of those actuated, being operated from their normal zero registration to a nine registration.

The movement of the familiar carrying mechanism of the machine in this operation is utilized to control the reversal of the actuator to effect a correction of the overdraft. The carry mechanism includes carrying levers 166 (Fig. 14) normally latched in their forward position as shown, but adapted to be tripped to and resiliently latched in their rearward position by a lug 167 on the numeral wheel in a direct transit from zero to nine. Abutting directly behind the carry lever 166, of the numeral wheel cooperating with the next to last carrying order of the actuator toward the left, is a lever 168, pivoted to the machine frame at 169. The pivot 169 permits movement of lever 168 in a vertical plane when its carry lever 166 is tripped. Pivoted for movement in a horizontal plane, to the end of the lever at 170, is a bifurcated tail piece 171. This tail piece is movable on its pivot by means under control of the main division slide, presently to be described in connection with the means for terminating the additive correction stroke, and in its operative position overlies the foot 172 of a vertical lever 173 pivoted at 174 on a second lever 175 which is pivoted to the machine frame at 169. Pivoted to the lever 175 at 176, is a depending link 177, (see also Fig. 4), the lower end of which engages one arm of a bell crank 178 pivoted to a standard 179 on the machine frame. The upper arm of the bell crank 180 operates against a collar 181 on the shaft 41 in such a manner that rocking of the bell crank brought about by downward pressure on link 177, shifts the shaft 41 so that it carries its pin 40 into engagement with the gear 37 which serves to drive the actuator in the positive or additive direction. This shift is positively brought about by means driven from the actuator and controlled by the numeral wheels in an overdraft operation.

In an overdraft operation the carrying lever 166 of the controlling denominational order is rocked to the rear carrying with it the lever 168 and depressing its tail piece 171. This depresses the foot 172 of the vertical lever 173, locking said lever against the pressure of spring 173a to depress a pin 182 slidably arranged in a socket in the upper end of lever 175 and arranged to be retained in either of its two adjusted positions by a spring pressed ball indicated at 183. These operations occur just before the actuator reaches its full cycle position and their result is to project the end of pin 182 into a position where it will be engaged by a specially formed cam face 184 on a plate 185 fixed on the left end of the actuator shaft. This engagement taking place while the actuator is still under drive in the negative direction, drives the system including lever 175, link 177, bell crank 178, and shaft 41 to positively carry the pin 40 out of its seat in gear 38 and into its seat on gear 37, just as the actuator reaches full cycle position and against the force of spring 44 which is compressed in this operation, rendering unnecessary a release of the link 35 which normally controls the position of pin 40 and also controls the main actuator clutch. Thus the actuator is reversed without disengaging the main clutch and enters upon an additive cycle.

Pressure on the linkage system above outlined, is at once relieved upon reversal of the actuator, but a reseating of the pin 40 in gear 38 seat under pressure of spring 44 is prevented by the displacement of the seat, and reversal in half cycle position is prevented by the relative speed with which the two gears 37 and 38 are rotated. At the end of a single cycle of additive rotation, the actuator is arrested in full cycle position by disengagement of the main clutch and spring 44 is permitted to reseat pin 40 in seat in gear 38.

Clutch disengagement at the end of the corrective additive rotation is accomplished under control of a lever 186, doubly pivoted for limited universal movement at 187. A spring 188, tensioned between the upper portion of the lever and a fixed portion of the frame work, urges the lever toward its operative position but it is normally maintained in inoperative position by a link 189, one end 190 of which abuts against a tail of the lever on the side opposite the spring and the other end of which is formed with a cam face 191 (see Fig. 5). When the main division slide 152 is in its inoperative position, a depending arm 192 thereon, lies in the path of the link 189 and prevents it being forced to the left, in Figure 4, by the force of spring 188, thus maintaining the lever 186 in its inoperative position. However, when the main division slide is moved rearwardly to its operative position, the depending arm 192 is carried out of the path of the link 189 and the spring 188 is permitted to move the lever 186 into operative position. The upper arm of this lever lies in the fork of the bifurcated tail piece 171 hereinbefore referred to, and this tail piece is carried to its operative position along with the lever. In its operative position the end of the lever 186 lies in the path of a cam 193 (see Fig. 15) carried on one of the actuator segments. The end of the camming member which approaches the lever during subtractive rotation of the actuator, carries a side bevel 194 which acts to move the lever 186 aside without tripping it, but the end which approaches the lever in additive rotation of the actuator carries a cam face 195 which acts to rock the lever 186 about its vertical pivot, lifting its tail 196. This tail underlies and thus acts to lift one end 197 (see Fig. 4) of a double lever system 198. Expediently pivoted in the machine the other end 199 (see also Fig. 6) of said lever system lies in an aperture in the rearward end of the actuator clutch control link 13. The lift exerted on the end 197 of the double lever system causes a corresponding lift at the end 199, raising the clutch control link 13 clear of pin 12 and the actuator clutch control bell crank 7. Thus released, the bell crank 7 at once contacts the clutch housing 4 under urge of spring 10, and as the clutch reaches full cycle position, the foot 9 enters the aperture in the clutch housing and disengages the clutch, locking the actuator in full cycle position. During the additive rotation just completed a cam 185a (see Fig. 16) formed on plate 185 acts to restore pin 182 to its normal inoperative position.

Means are provided for causing automatic engagement of the carriage shift clutch upon disengagement of the main actuator clutch. A lever 200 (Fig. 6) pivoted at 201 on a rigid member dependent from the carriage track, has an angular tail portion 202, overlying the clutch control link 13, and a nose overlying locking pawl 157 and a lever 203 fixed on control shaft 115. When the control link 13 is raised to arrest the actuator at the end of the corrective additive rotation, the pawl 200 is rocked clockwise and its nose depresses lever 203 (see also Fig. 12), rocking control shaft 115 to trip the automatic carriage shift control mechanism as hereinbefore set forth.

The carriage shift clutch 58 then proceeds through a single cycle of operation at the end of which the cam 64 on its sleeve which has been moved into cooperative relation with arm 204 by the setting of the main division lever, trips said arm, rocking the shaft 205 to which it is fixed. The opposite end of this shaft carries an arm 206 (Fig. 1) underlying a pin 11 on the actuator clutch control crank 7. Rocking of the shaft 205 consequently rocks the bell crank 7 to reengage the main actuator clutch and it is latched in this position by a reengagement of the pin 12 in the notched end of control link 13, until the end of a subsequent corrective addition cycle when said link is again lifted. The tour of operations thus repeats itself in consecutive denominational orders until the carriage reaches home position.

Means are provided for terminating the calculation at the end of a tour of operations if the carriage is in its home position. Pawl 207 (Fig. 6) pivoted at 208, has a nose overlying both latches 157 and 158 which it trips concurrently, completely releasing the main division slide 152 so that it may be returned to inoperative position by its spring 154 to terminate a calculation. A link 209 connects the tail of lever 207 with one end of a finger 210 pivoted at 211 and positioned to project through an aperture in the carriage track into contact with the under side of the carriage in which direction it is urged by spring 212. The aperture is so positioned that the carriage covers it and blocks the rise of the finger except when said carriage is in its home position. The lower end of the finger also carries a pivoted latch 213 which projects it through a slot in plate 214, depending from the lower side of the carriage track and is urged into latching position against the lower end of said slot by a spring 215 tensioned between an intermediate portion of the latch and the depending plate 214.

The nose of the latch overlies the actuator clutch control link 13 and is therefore raised at the conclusion of each corrective additive rotation when the actuator clutch is disengaged. If the carriage is out of home position, the finger 210 is unable to rise under urge of spring 212, and the latch merely falls back without effect. If, however, the carriage is in home position, the spring moves the finger through the aperture and concurrently moves link 209 to the right, rocking lever 207 and depressing the tails of underlying latches 157 and 158, thus completely releasing the main division slide 152, which returns to its inoperative position, terminating the calculation. The carriage shift trip slide 103 is, as usual, tripped to its operative position by lever 200, but is returned to inoperative position before being actuated by the action of cam face 216 on the supplementary division slide 153 which depresses pin 217 on the trip slide latching member, depressing this lever and positively camming the slide 103 to its inoperative position.

Manually controlled means are provided for terminating a calculation prior to its completion. The calculation may be terminated at the conclusion of its tour of operation in any denominational order by a manual return of the division lever 150, to its inoperative position at any time during the tour of operation. This carries the supplementary division slide 153 (Fig. 13) to its forward position and a cam face 216 formed thereon acts on a lug 217 formed on latch member 158 to release said latch from the notch 160 in the main division slide. The main division slide is, however, maintained in its operative position by latch 157 until the end of the tour of operations when it is tripped by the rocking of the overlying lever 200, the tail of which overlies actuator clutch control link 13. Tripping of latch 157 completes the release of the main division slide 152, permitting it to return to inoperative position and terminating the calculation.

The second latch 157 may alternatively be released by manually operated means under control of the zero multiplier key to terminate the calculation at the end of any cycle of the actuator and before completion of a tour of operations. The foot of the zero multiplier key is provided with a cam face 218, designed to cooperate with a complementary cam face 219 formed on a portion of slide bar 220, the primary purpose of which is to move the slide bar rearwardly to release any multiplier keys locked in their depressed position. The slide bar 220 carries a laterally extended pin 221. This pin extends laterally to abut one arm of a bell crank 222 pivoted on the side frame, the other arm of which underlies an extension 223 of latch 157. The latch 158, having been disengaged by the return of the division lever to inoperative position, a depression of the zero multiplier key will move pin 221 rearwardly, rocking bell crank 222 and lifting latch 157, completing the release of the main division slide 152 which returns to its inoperative position and terminates the calculation at the end of the immediate cycle during which the zero multiplier key has been depressed. This last releasing means for the second latch 157 is only used, however, when the machine has been misoperated, as when the division lever has been pulled when no factors are set in the machine, under which condition it operates continuously in the subtractive direction and no other means is effective to arrest it.

*Power control*

Means are provided for controlling the circuit of the driving motor to effect closure thereof only when one of the several machine controls is functioning. A pair of normally open, spring blade contact 225 (Fig. 1) are connected in series in the motor circuit and are mounted in a suitable insulating block fixed to shaft 226, journaled in the frame. Clockwise oscillation of shaft 226 is adapted to bring the near contact blade against abutment 227 to effect a closure of the contact. One means for producing this oscillation of the shaft comprises a lever 228, fixed to one end thereof and connected by a push link 229, a shouldered end of which is retained in a slot in lever 228, to a lever 230 fixed to shaft 231 journaled in the frame. Lever 230 has a laterally extending upper portion 232 and arm 233 loosely pivoted on shaft 231 lies between the lateral extension 232 and the rear side of the clutch control bell crank 7, so that a rocking of this bell crank to cause engagement of the actuator clutch will rock lever 230 rearwardly, effecting closure of the motor circuit through the linkage just described. When an operating bar is released after the clutch has started its rotation the clutch control bell crank 7 returns slightly, and the foot 9 thereof rides on clutch housing 4. Under certain conditions of wear, this slight return would be sufficient to open contact 225, and use is therefore made of the clutch centering lever 7a to maintain them closed during displacement of the clutch from full cycle position. The clutch centering lever 7a is journaled coaxially with the clutch control bell crank, and the foot thereof normally engages a cam depression 4a, in the clutch housing, to positively center the clutch in full cycle position. When the clutch leaves full cycle position the lever is moved to the rear and contacts lateral extension 232 on lever 230, to maintain the contact 225 in closed position during the cycle.

A second means for operating the contacts comprises a lever 235 (see Fig. 20) pivoted to the frame at 236 and supported by frame 237. One end of this lever has a perforated angular portion 238 which receives an angled end of shaft 226 while the other end is provided with a foot 239 underlying arm 240 fixed on one end of shaft 80. This shaft 80 supports three members, any of which may effect its oscillation, the accumulator clear clutch bell crank 79, the counter clear clutch bell crank 91, and the shift clutch power control lever 241. Each of these is journaled on the shaft 80 and carries a projection 242 extending into a wider groove in the shaft so that oscillation of any of these members will effect oscillation of the shaft without actuating the other members journaled thereon. Oscillation of shaft 80 by this means depresses arm 240 and foot 239, rocking shaft 226 in the proper direction to effect closure of the contact.

Arm 240, when in its depressed position, overlies a pin 243 on the end of arm 244 fixed to the end of shaft 231 opposite lever 230. Consequently, when arm 240 is depressed it locks oscillation of shaft 231 and prevents actuation of the actuator clutch bell crank 7. Conversely, when the actuator clutch bell crank 7 is rocked to engage the clutch, the shaft 231 is rocked bringing the pin 243 into contact with the upper side of lever 240 and locking oscillation of shaft 80. This effects an interlock between the clear and shift keys and the main actuator clutch so that neither can be operated while the other is in operation. The shift clutch power control lever 241 has an arm lying directly behind pin 70 and the tail of the shift clutch key 71. It is thus oscillated by depression of the shift clutch key and is maintained in its adjusted position by the cam 65 on the sleeve of the shift clutch, which underlies another arm of the lever.

The contacts 225 are maintained closed during a division operation through the agency of the main division slide 152 which carries a cam face 245 on its rear end adapted, when the slide is moved to operative position, to contact the foot 239 depressing lever 235 for the duration of the computation.

It will be recalled that the main division slide in moving to its operative position, operates shifting fork 66 to position the restarting cam 64 in operative relation to its lever. The same shifting operation removes cam 65 from cooperative relation with lever 241 whose function is superfluous in division operation, since the power is maintained by the division slide.

We claim:

1. In a motor driven calculating machine having a shiftable carriage, carriage shifting means comprising a clutch operable to render the motor drive effective to shift said carriage, means for engaging said clutch comprising a member arranged to be latched in operative relation with said drive, means for thereafter driving said member to cause engagement of said clutch and means controlled by the carriage shifting means for tripping said member from operative relation with said drive.

2. In a calculating machine, an element movable to initiate an automatic division operation, manual means for moving said element to effective position, means effective on return of said manual means for partially releasing said element, and means effective on completion of a significant portion of said operation for completing the release of said element to terminate the calculation.

3. In a calculating machine, an element movable to initiate an automatic division operation, manual means for moving said element to effective position, means effective on return of said manual means for partially releasing said element, and separate manual means for completing the release of said element to terminate the operation.

4. In a motor driven calculating machine having a shiftable carriage, carriage shifting means comprising a clutch operable to render the motor drive effective to shift said carriage, means for engaging said clutch comprising a motor operated element, a member movable into the path of said element and movable by said element to cause engagement of said clutch, and means controlled by said carriage shifting means for moving said member out of the path of said element.

5. In a calculating machine, an element movable to initiate an automatic division operation, a pair of latches for holding said element in effective position, manually operable means for releasing said element from one of said latches, and separate means automatically effective upon completion of a significant portion of said operation for completing the release of said element to terminate the calculation.

6. In a calculating machine, an element movable to initiate an automatic division operation, manually operable means for partially releasing said element, and separate means automatically effective upon completion of a significant portion of said operation for completing the release of said element to terminate the calculation.

7. In a calculating machine, an element movable to initiate an automatic division operation, a pair of devices for holding said element in effective position, and means for effecting release of said element therefrom comprising means for releasing said devices seriatim.

8. In a calculating machine, an element movable to initiate an automatic division operation, a pair of devices for holding said element in effective position, and means for effecting release of said element therefrom comprising manually operable means for releasing said devices seriatim.

GUSTAV LERCH.
CARL M. F. FRIDEN.